No. 857,895. PATENTED JUNE 25, 1907.
G. H. & W. B. PARKIN.
SINGLE TRIGGER MECHANISM FOR FIREARMS.
APPLICATION FILED MAY 28, 1906.
2 SHEETS—SHEET 1.
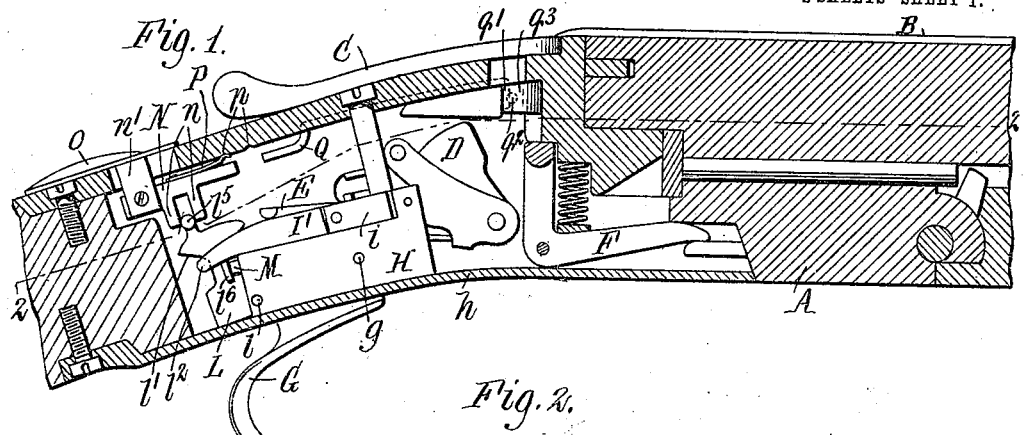
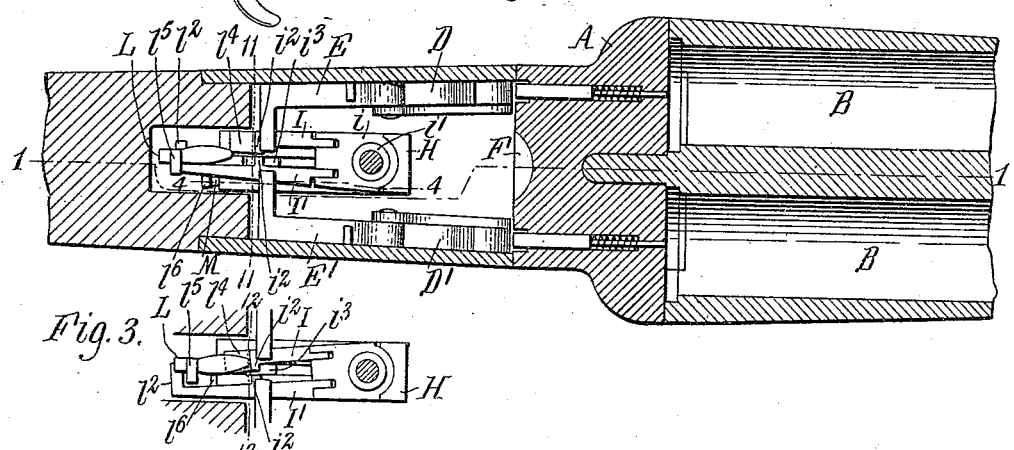
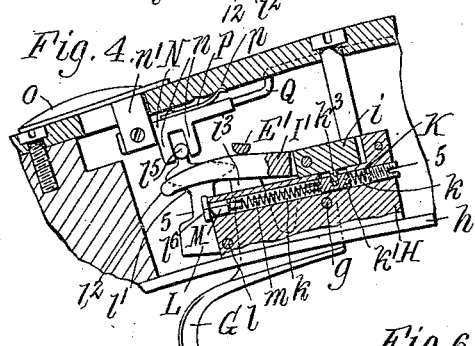
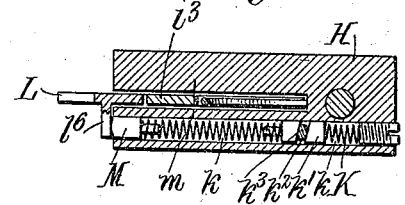
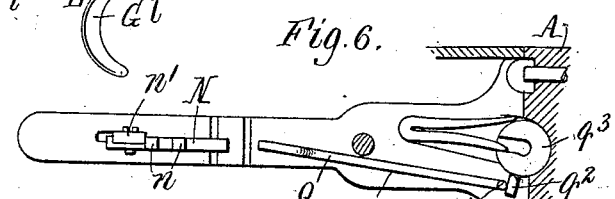
Witnesses:
E. A. Volk.
A. G. Dimond
Inventors
George H. Parkin
and
William B. Parkin
By Wilhelm Parker Hard, Attorneys.

No. 857,895. PATENTED JUNE 25, 1907.
G. H. & W. B. PARKIN.
SINGLE TRIGGER MECHANISM FOR FIREARMS.
APPLICATION FILED MAY 28, 1906.
2 SHEETS—SHEET 2.
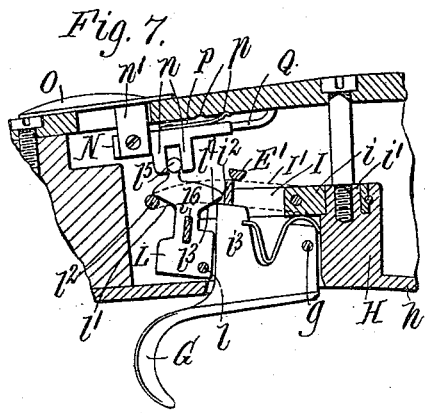
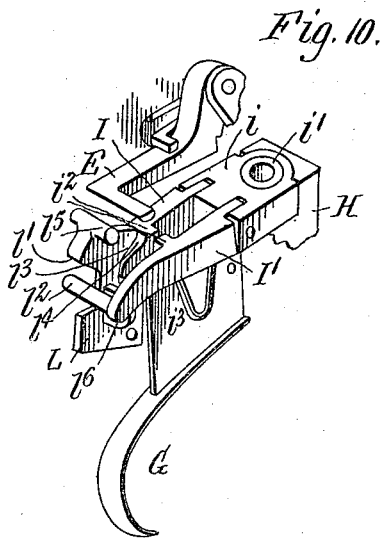
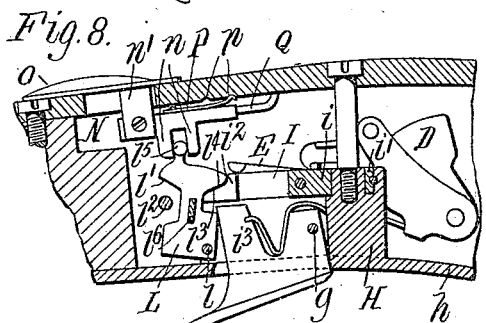
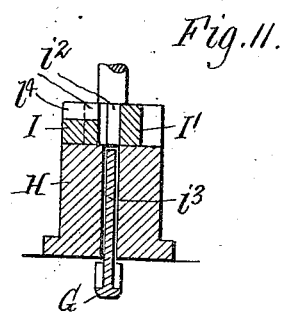
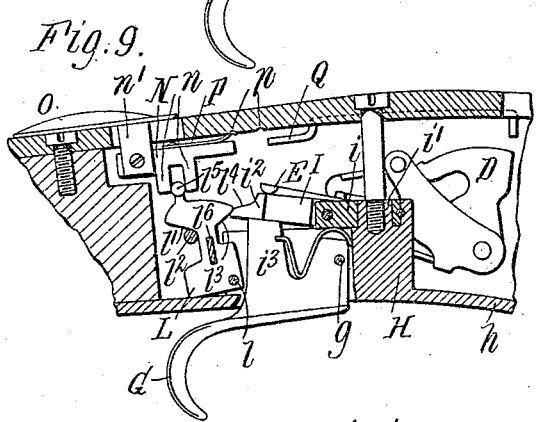
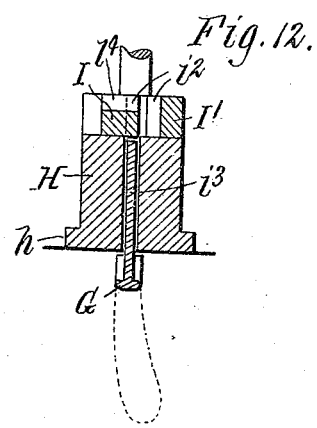
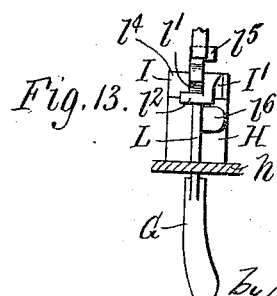
Witnesses:
E. A. Volk.
A. Geo. Dimond.
Inventors
George H. Parkin
William B. Parkin
By Wilhelm Parkin Had Attorneys.
THE NORRIS PETERS CO., WASHINGTON, D. C.

UNITED STATES PATENT OFFICE.

GEORGE H. PARKIN AND WILLIAM B. PARKIN, OF BATAVIA, NEW YORK.

SINGLE-TRIGGER MECHANISM FOR FIREARMS.

No. 857,895.          Specification of Letters Patent.          Patented June 25, 1907.

Application filed May 28, 1906. Serial No. 318,995.

*To all whom it may concern:*

Be it known that we, GEORGE H. PARKIN and WILLIAM B. PARKIN, citizens of the United States, residing at Batavia, in the county of Genesee and State of New York, have invented a new and useful Improvement in Single-Trigger Mechanisms for Firearms, of which the following is a specification.

This invention relates to trigger mechanisms for fire-arms having a plurality of barrels, in which a single trigger controls the hammers for two or more of the barrels.

The invention is applicable to guns having two or more than two barrels.

The primary object of the invention is to produce an efficient, reliable and safe single trigger mechanism by which the barrels can be discharged alternately in either order, or either barrel fired repeatedly at the will of the operator.

Other objects of the invention are to so construct the trigger mechanism that it will be absolutely reliable in use and will prevent the possibility of double firing, that is the discharging of the second barrel by reason of an involuntary second pull on the trigger caused by the recoil of the gun incident to the first discharge; to provide a change device arranged in a convenient position on top of the pistol grip of the gun where it can be readily operated with the thumb for setting the mechanism to discharge either barrel when the mechanism is in position for discharging the other barrel; to make the construction such that it is impossible to discharge both barrels simultaneously; to provide a lock or controlling device for the sear trippers which is actuated by the operation of one sear tripper to lock the other sear tripper from movement.

Still another object of the invention is to improve and simplify single trigger mechanisms for double-barreled fire-arms in the respects hereinafter described and set forth in the claims.

In the accompanying drawings, consisting of two sheets: Figure 1 is a sectional elevation of the breech and lock of a double-barreled breech loading fire-arm provided with a single trigger mechanism embodying the invention, in line 1—1, Fig. 2. Fig. 2 is a sectional plan thereof in line 2—2, Fig. 1, showing the parts in the normal position for discharging the right-hand barrel. Fig. 3 is a fragmentary plan view of the trigger mechanism, showing the parts set for discharging the left-hand barrel. Fig. 4 is a sectional elevation of the lock in line 4—4, Fig. 2, but showing the parts in the position assumed in discharging the right-hand barrel. Fig. 5 is a sectional plan view, on an enlarged scale, of the trigger block and parts carried thereby, in line 5—5, Fig. 4. Fig. 6 is a bottom plan view, partly in section, of the top extension of the breech block and the parts mounted thereon. Fig. 7 is a central sectional elevation of the lock showing the parts in the position assumed in discharging the right-hand barrel. Fig. 8 is a central sectional elevation of the lock showing the parts set for discharging the left-hand barrel. Fig. 9 is a similar view, showing the parts in the position assumed in discharging the left-hand barrel. Fig. 10 is a fragmentary perspective view of the lock showing the parts in the same position as in Fig. 8, or set for discharging the left-hand barrel. Fig. 11 is a transverse sectional elevation, on an enlarged scale, of the trigger block and parts thereon, in line 11—11, Fig. 2, showing the sear trippers in the normal position or set for discharging the right-hand barrel. Fig. 12 is a similar view, in line 12—12, Fig. 3, showing the sear trippers set for discharging the left-hand barrel. Fig. 13 is a rear sectional elevation of the trigger block and parts mounted thereon.

The single trigger mechanism forming the subject matter of this invention is shown in the drawings and will be hereinafter described as applied to a double-barreled break-down breech loading gun of the so-called hammerless type having hidden tumblers, but the improvements are not necessarily restricted in application to this particular type of fire-arm.

The trigger mechanism, briefly stated, is organized and operates as follows: The trigger is arranged centrally in the lock below the sears for the two hammers or tumblers. Two sear trippers are arranged between the trigger and the sears to swing vertically to trip the sears and to swing horizontally to place one or the other of the sear trippers over the trigger so as to be lifted to trip its sear when the trigger is pulled. Each sear tripper is always in operative relation with its sear, but the trippers are normally pressed to the left by a spring to hold the tripper for the right-hand sear in operative position over the trigger. When the trigger is pulled this tripper is lifted and trips the right-hand sear, thus discharging the right-hand barrel, and this tripper moves a controller into engagement with the other sear tripper whereby the latter is prevented from being lifted to trip its sear. When the trigger is released the controller is held in the position to which it has been moved and presses on a spring by which the sear tripper is swung to the right to place the left-hand sear tripper in operative position over the trigger. When the trigger is again pulled, the left-hand sear tripper is lifted and trips the left-hand sear, thus discharging the left-hand barrel, and at the same time forces the controller back to its normal position in which it prevents the lifting of the right-hand sear tripper and consequently the discharge of the right-hand barrel. When the trigger is again released, the pressure of the controller on the spring for the sear trippers being removed, the trippers are returned by the other spring to their normal position. Thus the right-hand barrel is discharged first and then the left, by successive pulls of the trigger. A device is operated by the breech lever or by some other part when the gun is reloaded to return the tripper controller to its normal position, so that by reloading the right-hand barrel before discharging the left-hand barrel the sear trippers will be reset for discharging the right-hand barrel upon the next pull of the trigger. A change device is also provided whereby the tripper controllers can be shifted by hand at any time when it is desired to discharge the left-hand barrel first, the left-hand sear tripper being thereby placed in operative position over the trigger. This change device can be moved at any time from one position to the other so that the operator can fire the right or left-hand barrel at will.

Like letters of reference refer to like parts in the several figures.

A represents the breech block of a double barrel fire-arm, B the breech ends of the barrels which are pivoted, as usual, to the breech block to break downwardly, C the breech lever for locking the barrels in closed position, D and D' the hammers or tumblers, E E' the sears controlling the hammers or tumblers, and F the cocking lever which is operated when the breech is opened to cock or set the tumblers. These parts all operate in the well known manner and may be of any usual or suitable construction. The gun shown is of the so-called hammerless type, in which the hammers or tumblers for striking the firing pins are inclosed in the lock. But the invention could be applied to firearms with exposed hammers without material change, and the term "hammers" will be used in this specification to mean either exposed hammers or inclosed tumblers.

G represents the trigger. This is arranged centrally of the lock in the usual position and is preferably pivoted at or near its front end, by a pin $g$, or in any other suitable manner, to a trigger block H secured to the usual trigger plate $h$ and extending up in the lock between the hammers and their controlling sears. The sears are, as usual, pivoted to the lock side plates and are provided at their rear or free ends with inwardly projecting lateral arms. Two sear operating levers or trippers are arranged beneath the lateral arms of the sears and are movable laterally to place one or the other thereof over the trigger, and they are also movable vertically to trip the sears. The sear trippers I I' are preferably pivoted at their front ends in any suitable manner to swing vertically on a switch block $i$ which in turn is pivoted to swing laterally on a pivot post $i'$, or in any other suitable manner, on the front portion of the trigger block. The sear trippers are provided with opposite lugs $i^2$ which extend toward each other and either of which is adapted to be placed vertically above an upright central part $i^3$ of the trigger, by moving the switch block to one side or the other on its pivot post. The switch block is normally pressed to the left by a suitable spring, so that the lug $i^2$ of the right-hand sear tripper is held over the upright portion of the trigger. For this purpose a coil spring K, Figs. 4 and 5, is preferably employed located in a longitudinal hole $k$ in the trigger block and pressing rearwardly a slide $k'$ having an inclined slot $k^2$ in which engages a lug $k^3$ depending from the switch block. This lug is located at the right-hand side of the pivot for the switch block, so that the pressure of the spring holds the switch block over to the left, as stated.

L represents a tripper lock or controller which is preferably of the novel shape shown in the drawings, see Figs. 4, 5 and 7—10, and is pivoted at its lower end to the rear portion of the switch block by a pin $l$, or in any other suitable manner, to swing forwardly and rearwardly in a vertical plane. The controller has a rear projection with an inclined or cam face $l'$ which overhangs a lateral finger $l^2$ on the rear end of the right-hand sear tripper, and a front projection with an inclined or cam face $l^3$ adapted to be moved forwardly over a cam or inclined face $l^4$ on the rear end of the left-hand sear tripper. The controller also has an upwardly projecting lug $l^5$ for engagement with a change device to be described, and a lateral lug or arm $l^6$ adapted through suitable connections to swing the switch block to the right when the controller is swung forward. These connections preferably consist of a plunger M, Figs. 4 and 5, arranged to slide in the hole $k$ in the trigger block, and a coil spring $m$ between this plunger and the operating slide $k'$ for the switch block. When the controller is moved forwardly this spring $m$ will be compressed by the plunger M and will force the slide $k'$ forwardly, thereby swinging the switch block, with the sear tripper levers, to the right against the action of the other spring K, the strength of the springs being adjusted to permit this action.

The operation of the parts thus far described is as follows:—With the parts in the normal position, shown in Figs. 1, 2 and 11, that is set for discharging the right-hand barrel, the lug $i^2$ on the right-hand sear tripper will be over the upright portion of the trigger. When the trigger is pulled it will raise the right-hand tripper, and through it, the right-hand sear, and release the right-hand hammer, thereby discharging the right-hand barrel. When this sear tripper is raised the lateral finger $l^2$ on its rear end will slide upwardly on the rear inclined face $l'$ of the controller L and force the controller forwardly with its front inclined face $l^3$ over but out of contact with the inclined or cam face $l^4$ on the rear end of the left-hand sear tripper, so that this tripper cannot be lifted and cause the discharge of the left-hand barrel. The controller L is held in this position by means to be described, when the trigger is released and the pressure thereof on the spring plunger M will cause the switch block to swing to the right and place the lug $i^2$ of the left-hand sear tripper I in operative position over the upright portion of the trigger, as shown in Figs. 3 and 12. When the trigger is pulled the second time the left-hand sear tripper will be lifted, causing the discharge of the left-hand barrel and the cam face $l^4$ on the rear end of this sear tripper will engage the front cam face $l^3$ of the controller and will return the latter to its initial position. The pressure on the spring plunger M is thereby relieved and the switch block operating spring K will again assert itself and swing the switch block to the right to again place the sear trippers in the normal position with the lug $i^2$ of the right-hand tripper in operative position over the trigger. The controller can be releasably retained in its forward position, in which it causes the sear trippers to remain in their left-hand position, by any suitable spring or device, but preferably the following means are employed: N represents a change block which is slidably mounted on the upper extension of the breech block and is provided with depending lugs or projections $n$ between which the upwardly extending lug $l^5$ of the tripper controller engages, whereby the change block is moved with the controller and is adapted, when shifted by hand, to move the controller forwardly and rearwardly. The change block, as shown, is provided with an upright post $n'$ which extends through a slot in the top extension of the breech block, and is provided with a thumb piece or operating button O. A latch spring P is secured at one end to the top of the change block with its free end bearing against the underside of the top extension of the breech block which is provided with two notches $p$ into either of which the spring is adapted to snap. The change block can be readily shifted forwardly or rearwardly by pressure of the thumb in the proper direction on the thumb piece O, and it will be held in one or the other of its two positions by the engagement of the latch spring in one of the notches $p$. The change block is moved by the controller in the operation of the latter by the sear trippers, and this one device therefore acts to releasably hold the controller in its normal and forward positions described, and also enables the controller to be changed by hand at will, from one position to the other, to set the sear trippers for discharging either desired barrel.

The means before mentioned for setting the sear trippers in position to discharge the right-hand barrel by opening the breech, consist, in the mechanism shown, of a push rod Q, see Figs. 1 and 6, which is slidably confined in a groove $q$ in the underside of the top extension of the breech block and has an offset rear end adapted to strike the change block N and a depending front end $q'$ adapted to be engaged by an arm $q^2$ projecting laterally from the pivot post $q^3$ of the breech lever C. When the breech lever is moved in opening the breech after the discharge of only the right-hand barrel, its arm $q^2$ pushes the rod Q rearwardly which returns the change block and controller to the normal rear position, thus setting the sear trippers to again discharge the right-hand barrel before the next pull of the trigger. The right-hand barrel can, therefore, be repeatedly discharged, if desired, simply by reloading it before discharging the left-hand barrel and pulling the trigger. If the sear trippers are in position for discharging the right-hand barrel and it is desired to discharge the left-hand barrel instead, the thumb piece O and change block are moved forwardly thereby, through the means described, setting the left-hand sear tripper in operative relation to the trigger. Either barrel can in this manner be discharged at the will of the user. When the left-hand barrel is discharged after the right before loading, the tripper controller is returned to its normal rear position by the inclined face of the left-hand sear tripper, and when the breech is opened the change block will be out of reach of the push rod Q and will not be affected thereby. The push rod is only actuated automatically to return the tripper controller to normal position when reloading before the discharge of the left-hand barrel.

The part N referred to as the change block is provided on some makes of guns as a safety device, being provided with means for preventing the discharge of the gun when moved to the safety position. The change block can be similarly employed as a safety device in the mechanism described, but as the safety connections form no part of this invention they are not herein shown or described.

The construction of the mechanism is such that the second barrel of the gun cannot be discharged by an involuntary second pull on the trigger, resulting from the recoil of the gun from the first discharge. This has been demonstrated by severe practical tests and is believed to be due to the fact that the tripper controller will block the firing movement of one sear tripper until the trigger has been completely released and the other sear tripper, which was raised by the trigger, has been allowed to descend and the switch block shifted to place the inactive sear tripper in operative relation to the trigger.

The trigger mechanism shown in the drawings is constructed to discharge the right-hand barrel upon the first pull of the trigger after loading the gun, and this action is described as the normal one, but manifestly by a mere reversal of the arrangement of the parts the mechanism could be made to discharge the barrels in the reverse order.

We claim as our invention:

1. The combination of a plurality of hammers and controlling sears therefor, a single trigger, sear trippers movable to place either one in operative relation to the trigger, a tripper controller which is moved by one sear tripper into locking relation to the other sear tripper, and means actuated by said tripper controller for moving another sear tripper into operative relation to said trigger, substantially as set forth.

2. The combination of a plurality of hammers and controlling sears therefor, a single trigger, sear trippers movable into and out of operative relation to the trigger, means for normally placing one sear tripper in operative relation to the trigger, a tripper controller which is moved by the operative sear tripper, means actuated by said tripper controller to move the other sear tripper into operative relation to the trigger, and means acting upon the operation of said last mentioned sear tripper to return said tripper controller and sear trippers to the initial position, substantially as set forth.

3. The combination of a plurality of hammers, and controlling sears therefor, a single trigger, sear trippers movable into and out of operative relation to the trigger, means for normally placing one sear tripper in operative relation to the trigger, a tripper controller which is engaged and moved by said operative sear tripper, means actuated by said tripper controller to move the other sear tripper into operative relation to the trigger, said last mentioned sear tripper having a part which returns said tripper controller to the initial position when said sear tripper is actuated to allow the return of the sear trippers to the normal position, substantially as set forth.

4. The combination of a plurality of hammers, and controlling sears therefor, a single trigger, sear trippers movable into and out of operative relation to the trigger, a spring for normally holding one sear tripper in operative relation to the trigger, a tripper controller which is moved by said operative sear tripper, a spring which is strained by the movement of said tripper controller and moves said sear trippers against the action of said other spring to place the other sear tripper in operative relation to the trigger, and means acting upon the operation of said last mentioned sear tripper to return said tripper controller to the initial position, substantially as set forth.

5. The combination of a plurality of hammers, and controlling sears therefor, a single trigger, a laterally movable switch block, sear trippers pivoted to said switch block to swing vertically, a spring for moving said switch block to place one sear tripper in operative relation to the trigger, a tripper controller which is moved by said operative sear tripper, a spring which is strained by the movement of said tripper controller and moves said switch block against the action of said other spring to place the other sear tripper in operative relation to the trigger, and means acting upon the operation of said last mentioned sear tripper to return said tripper controller to the initial position, substantially as set forth.

6. The combination of a plurality of hammers, and controlling sears therefor, a single trigger, sear trippers movable into and out of operative relation to the trigger, means for normally placing one sear tripper in operative relation to the trigger, and controlling means which are actuated by the operation of one sear tripper to move the other sear tripper into operative relation to the trigger and which are returned to the normal position by the actuation of said other sear tripper, substantially as set forth.

7. The combination of a plurality of hammers, and controlling sears therefor, a single trigger, sear trippers movable into and out of operative relation to the trigger, means for normally placing one sear tripper in operative relation to the trigger, controlling means which are actuated by the operation of one sear tripper to move the other sear tripper into operative relation to the trigger and which are returned to the normal position by the actuation of said other sear tripper, and a change device for placing the inoperative sear tripper in operative relation to the trigger, substantially as set forth.

8. The combination of a plurality of hammers, and controlling sears therefor, a single trigger, sear trippers movable into and out of operative relation to the trigger, means for normally placing one sear tripper in operative relation to the trigger, controlling means which are actuated by the operation of one sear tripper to move the other sear tripper into operative relation to the trigger and which are returned to the normal position by the actuation of said other sear tripper, and a change device for shifting said controlling means to move either sear tripper out of operative relation to the trigger and place the other sear tripper into operative relation to the trigger, substantially as set forth.

9. The combination of a plurality of hammers, and controlling sears therefor, a single trigger, sear trippers movable into and out of operative relation to the trigger, means for normally placing one sear tripper in operative relation to the trigger, controlling means which are actuated by the operation of one sear tripper to move the other sear tripper into operative relation to the trigger and which are returned to the normal position by the actuation of said other sear tripper, and means operated in opening the breech after the actuation of the first sear tripper for returning said controlling means to the normal position, substantially as set forth.

10. The combination of a plurality of hammers, controlling sears therefor, a single trigger, sear-trippers in operative relation to said sears, said sear-trippers being movable into and out of operative engagement with the trigger, means for normally placing one sear-tripper into operative engagement with the trigger, means for placing the other sear-tripper into operative engagement with the trigger after the actuation of the first-mentioned sear-tripper, and a change device for moving one sear-tripper out of and placing the other sear-tripper into engagement with the trigger, substantially as set forth.

11. The combination of a plurality of hammers, controlling sears therefor, a single trigger, sear-trippers which are movable vertically to trip said sears, said sear-trippers being movable laterally into and out of operative relation to the trigger, means for normally placing one sear-tripper into operative relation to the trigger, means for placing the other sear-tripper into operative relation to the trigger after the actuation of said first-mentioned sear-tripper, and a change device for moving one sear-tripper out of and placing the other sear-tripper into operative relation to the trigger, substantially as set forth.

12. The combination of a plurality of hammers, and controlling sears therefor, a single trigger, a sear tripper for each sear, which sear trippers are movable laterally into and out of operative relation to the trigger and are also movable vertically to actuate the sears, mechanism for normally placing one sear tripper in operative relation to the trigger and placing another sear tripper into operative relation to the trigger after the actuation of the trigger, and a change device for changing the position of the sear trippers at will, substantially as set forth.

13. The combination of a plurality of hammers, and controlling sears therefor, a single trigger, a sear tripper for each sear, which sear trippers are movable laterally into and out of operative relation to the trigger and are also movable vertically to actuate the sears, means for normally placing one sear tripper into operative relation to the trigger, a pivoted tripper controller having a cam face which is engaged by one sear tripper when actuated to move said tripper controller, means actuated by the movement of said tripper controller for placing another sear tripper into operative relation to the trigger, and another cam face on said tripper controller which is engaged by said other sear tripper when actuated to restore said tripper controller to the initial position, substantially as set forth.

14. The combination of a plurality of hammers, and controlling sears therefor, a single trigger, sear-trippers which are movable to place either one in position to be operated upon the actuation of the trigger, a tripper-controller which is moved by the actuation of one sear-tripper into position to lock another sear-tripper, and means actuated by said tripper-controller for moving another sear-tripper into position to be operated upon the actuation of the trigger, substantially as set forth.

Witness our hands, this 24th day of May, 1906.

GEORGE H. PARKIN.
WILLIAM B. PARKIN.

Witnesses:
C. W. PARKER,
A. L. McGEE.